Figure 1:
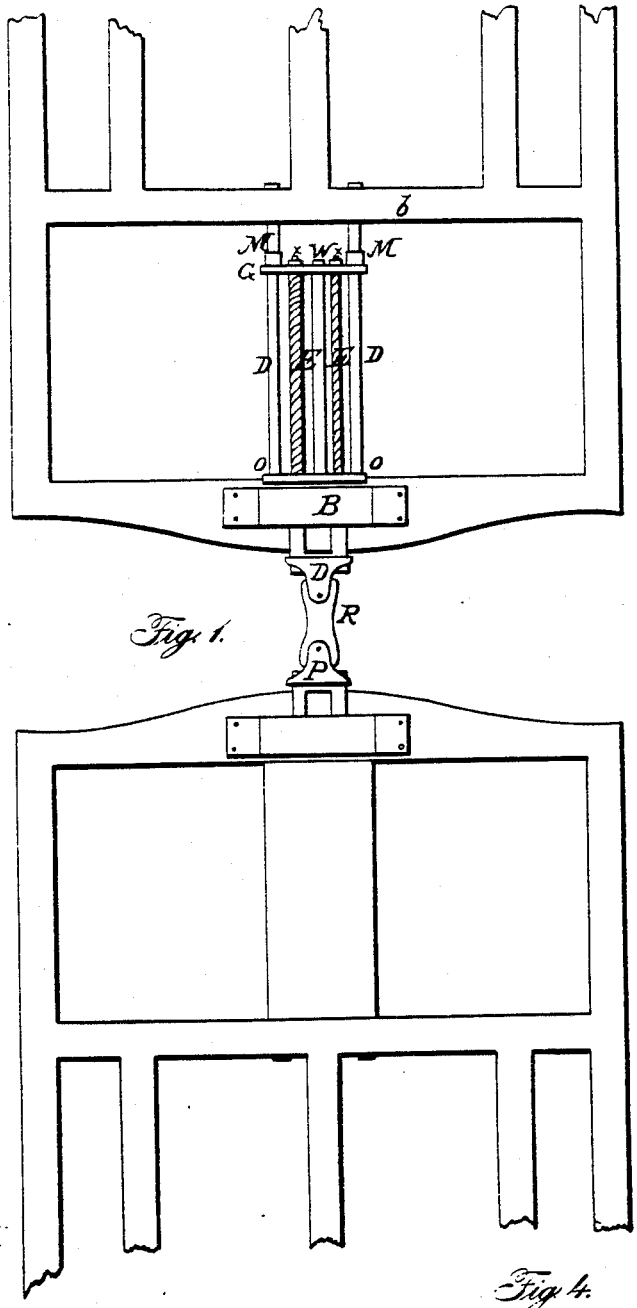
Figure 2:
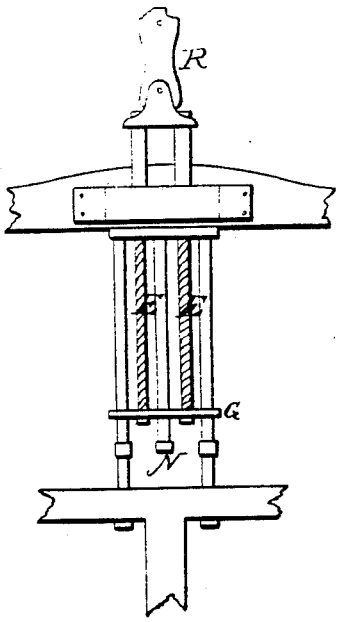
Figure 3:
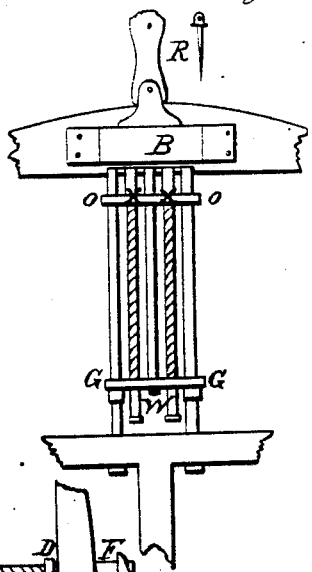
Figure 4:
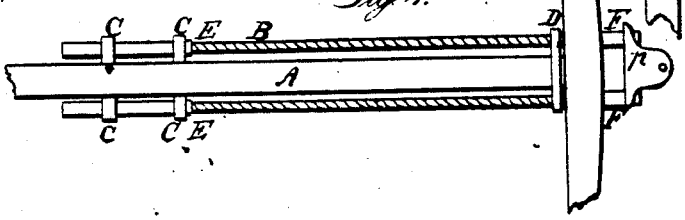

P. ALVERSON.

Car Bumper.

BEST AVAILABLE COPY

No. 16.

A. I. Patented Oct. 25, 1838.

"N. PHOTO" 1. SQ. N.Y. (OSBORNE'S PROCESS.)